United States Patent [19]
Kobayashi et al.

[11] Patent Number: 5,389,860
[45] Date of Patent: Feb. 14, 1995

[54] FOCUS CONTROL CIRCUIT FOR CRT

[75] Inventors: Masaki Kobayashi, Machida; Rieko Kataoka, Yamato; Akihiro Funakoshi, Kamakura, all of Japan

[73] Assignee: International Business Machines Corporation, Armonk, N.Y.

[21] Appl. No.: 114,812

[22] Filed: Aug. 31, 1993

[30] Foreign Application Priority Data

Aug. 31, 1992 [JP] Japan .................................. 4-232183

[51] Int. Cl.$^6$ .............................................. H01J 29/58
[52] U.S. Cl. ...................................... 315/382; 348/345
[58] Field of Search .............................. 315/382, 382.1; 348/345, 353

[56] References Cited
U.S. PATENT DOCUMENTS 4,214,188  7/1980  Bafaro et al. ...................... 315/382
4,961,031 10/1990  Kakagawa et al. .................. 315/382
5,245,254  9/1993  Lee ..................................... 315/382

*Primary Examiner*—Theodore M. Blum
*Attorney, Agent, or Firm*—David Aker

[57] ABSTRACT

A focus control circuit for a CRT includes a focus bias voltage setting device for setting a focus bias voltage, a bias voltage control device for controlling the focus bias voltage and the focus bias voltage setting device in response to control information, a first amplifier for amplifying a luminance setting voltage with an amplification factor determined by an amplification factor control voltage and for supplying the amplified luminance setting voltage to a transistor, and a resistor network and a second amplifier for dividing a voltage applied to a control grid and applying it to the first amplifier as a control voltage.

6 Claims, 7 Drawing Sheets

5,389,860

FOCUS CONTROL CIRCUIT FOR CRT

TECHNICAL FIELD

The present invention relates to a focus control circuit of a CRT display unit. More particularly it relates to a focus control circuit which compensates for changes in luminance.

BACKGROUND ART

Focus control circuits for adjusting the focal point of an electron beam on a screen of a CRT display are well known in the art. In a CRT display unit, there is an electrode (grid) for forming an electron lens using the electrostatic effect among a plurality of which form an electron gun. The converging capability of the electron lens is changed, that is, the magnification is changed, by changing the level of a voltage applied to the electrode (grid).

With reference to FIG. 1, construction of an electron lens is briefly described. An electron beam EB discharged from cathode K is concentrated by a control grid G1 and an accelerating grid G2, and a crossover point P is formed. An electron lens 1 concentrates an image of the crossover point P on a fluorescent screen 2, and is controlled by a focus bias voltage applied to focus grids G3 and G4.

An example of a conventional focus bias circuit is illustrated in FIG. 2. In the case of UPF (Unipotential Focus), a +B1 voltage source of approximately 1 kV and a −B2 voltage source of approximately −1500 V are used. For example, a character image of 80 NIT luminance is displayed and a variable resistor VR1 for controlling the focus is adjusted by using the human eyes or a microscope, so that the character image is focused on the fluorescent screen.

The characteristics required for an electron lens or an electron lens system are almost the same as those required for a general optical lens, such as that used in a camera. An attempt is made to decrease aberration by arranging lenses in multiple stages or using a lens of large aperture. Electron guns of different type have been suggested.

The arrangements mentioned above contributed mainly to an improvement in focusing of a motionless spot on the tube axis of a CRT. However, when scanning a problem associated with changes in the focal length appears.

With reference to FIG. 1 again, when a motionless spot on the tube axis of a CRT is best focused, magnification of the electron lens is determined by the following two factors: 1. the distance "a" between the crossover point P and the electron lens 1; and 2. the distance "b" between the electron lens 1 and the fluorescent screen 2. However, as shown in FIG. 3, the distance b differs between that for a spot on the tube axis and that at an end or edge portion of the fluorescent screen 2. The flatter the screen of the CRT, the longer is the distance b at the edges. In FIG. 3, the distance b is greater at the edge of the fluorescent screen 2 than at the spot on the tube axis, by the distance indicated by the symbol "c".

Thus, it is apparent that the focus bias voltage to be applied to each grid for obtaining the optimum spot on the tube axis must be somewhat corrected for positions other than on the tube axis. Specifically, when magnification "MO" on the tube axis is b/a, magnification "MI" at the edge in FIG. 3 is (b+c)/a.

Consequently, a conventional technique called "dynamic focus control" has been developed by which the focus bias voltage is automatically corrected for the beam scanning position on a fluorescent screen. Many treatises have been written and inventions have been disclosed in this area.

When the dynamic focus control technique is applied, a focus deviation is generated. The amount of the focus deviation differs somewhat with CRT types. For example, when a CRT of 15 inch flat square type is used, "a" is equal to approximately 25 mm and "b" is equal to approximately 310 mm.

The edge of the fluorescent screen is perpendicular to the tube axis and is 130 mm away from the tube axis. The radius of curvature is 1200 mm, and the center of curvature is at "O". In this case, "c" is equal to approximately 20 mm.

Consequently, in the case of this CRT, $$M0 = 310/25 = 12.4 \tag{1}$$

$$M1 = (310+20)/25 = 13.2$$

The variation in magnification for correcting c by the dynamic focus control is:

$$((M1/M0)-1)100 \approx 6.5\% \tag{2}$$

In this conventional technique, in addition to focus adjustment at predetermined luminance, dynamic focus control must be performed.

Consequently, as described below, when luminance is changed after the best focus has been obtained by adjusting a focus bias voltage at a predetermined luminance, the focus deviates. The conventional technique cannot correct this focus deviation.

SUMMARY OF THE INVENTION

It is an object of the present invention to provide a focus control circuit of a CRT display unit, which can solve the above problem and maintain the best focus even though luminance is changed.

Conventionally, variation in the distance "a" between the crossover point P and an electron lens 1 has not been taken into account. The present inventors found that emission from a cathode (emission area) is changed by changing luminance. Thus, the crossover point is moved, the above distance "a" varies and consequently the focus deviates.

For example, the focus bias voltage at which the best focusing is obtained differs between when the focus is adjusted at 80 NIT and when the focus is adjusted at 230 NIT.

Even if the deviation of the crossover point caused by the difference in luminance is very small, a correction of the same degree as the correction performed by the above dynamic focus control, is required. For example, when the distance "a" between the crossover point and the electron lens is 25 mm and luminance is 80 NIT, the above varying range of the magnification for correcting c by 6.5% actually corresponds to the correction of as much as 1.5 mm as follows:

$$(310/25)1.065 = 310/m$$

$$m = 23.5$$

$|25-m|=1.5$ mm

A correction range of 1.5 mm is required.

FIG. 4 shows the relationship between the focus (spot diameter) and a change in luminance (NIT) after the focus has been adjusted at a predetermined luminance. In FIG. 4, an open circle indicates the spot diameter obtained after the focus has been best adjusted at a particular luminance (beam current). A curve and a closed circle indicate the spot diameter when luminance (beam current) is changed at the focus bias voltage at which the focus is best adjusted. For example, when the focus is best adjusted at 230 NIT and then luminance is changed to 80 NIT, keeping the focus bias voltage the same, over-focus occurs and the spot diameter is larger than that when the focus is best adjusted. When the focus is best adjusted at 80 NIT and then luminance is changed to 230 NIT, keeping the focus bias voltage the same, under-focus occurs and the spot diameter is also larger than that when the focus is best adjusted. That is, the focus bias voltage at which the focus is best adjusted differs at each luminance. At a specific focus bias voltage, the focus is best adjusted at only a specific luminance. In FIG. 4, the curve shown in dotted lines shows the spot diameter when the focus is best adjusted at a specific luminance.

It is another characteristic of the CRT that the voltage between the control grid G1 and a cathode K for cutting off the electron beam when the video signal is black, differs from CRT to CRT because of variations in manufacturing. FIG. 5 shows the relationship between beam current and the focus bias voltage for obtaining the best focus when the voltage between G1 and K is 50 V, 70 V and 90 V by holding the voltage on cathode K constant and adjusting the voltage applied to accelerating gate or grid G2.

With reference to FIG. 5, the following are found:
(1) When the voltage between G1 and K changes, the characteristic curve of the relationship between the focus bias voltage and the beam current for obtaining the best focus, changes. The slopes of the characteristic curves also differ from one another. (2) The smaller the voltage between G1 and K, the larger the focus bias voltage. (3) The greater the beam current, the smaller is the focus bias voltage for obtaining the best focus.

The present invention provides a focus control circuit for a CRT which compensates for the above three conditions. The focus control circuit comprises:

focus bias voltage setting means;

bias voltage control means for controlling the focus bias voltage and the focus bias voltage setting means in response to control information;

amplifying means for amplifying a luminance setting voltage with an amplification factor determined by an amplification factor control voltage and supplying the amplified luminance setting voltage to the bias voltage control means as control information; and amplification factor control voltage supplying means for supplying a voltage based on a voltage to be applied to a control grid to the amplifying means as the amplification factor control voltage.

In accordance with the present invention, conditions (1) and (2) are compensated for by supplying the voltage based on the voltage to be applied to the control grid as the amplification factor control voltage. Condition (3) is compensated for by amplifying the luminance setting voltage with the amplifying means and supplying the amplified luminance setting voltage to the bias voltage control means as control information.

DETAILED DESCRIPTION OF THE PREFERRED EMBODIMENTS

Figure 6:
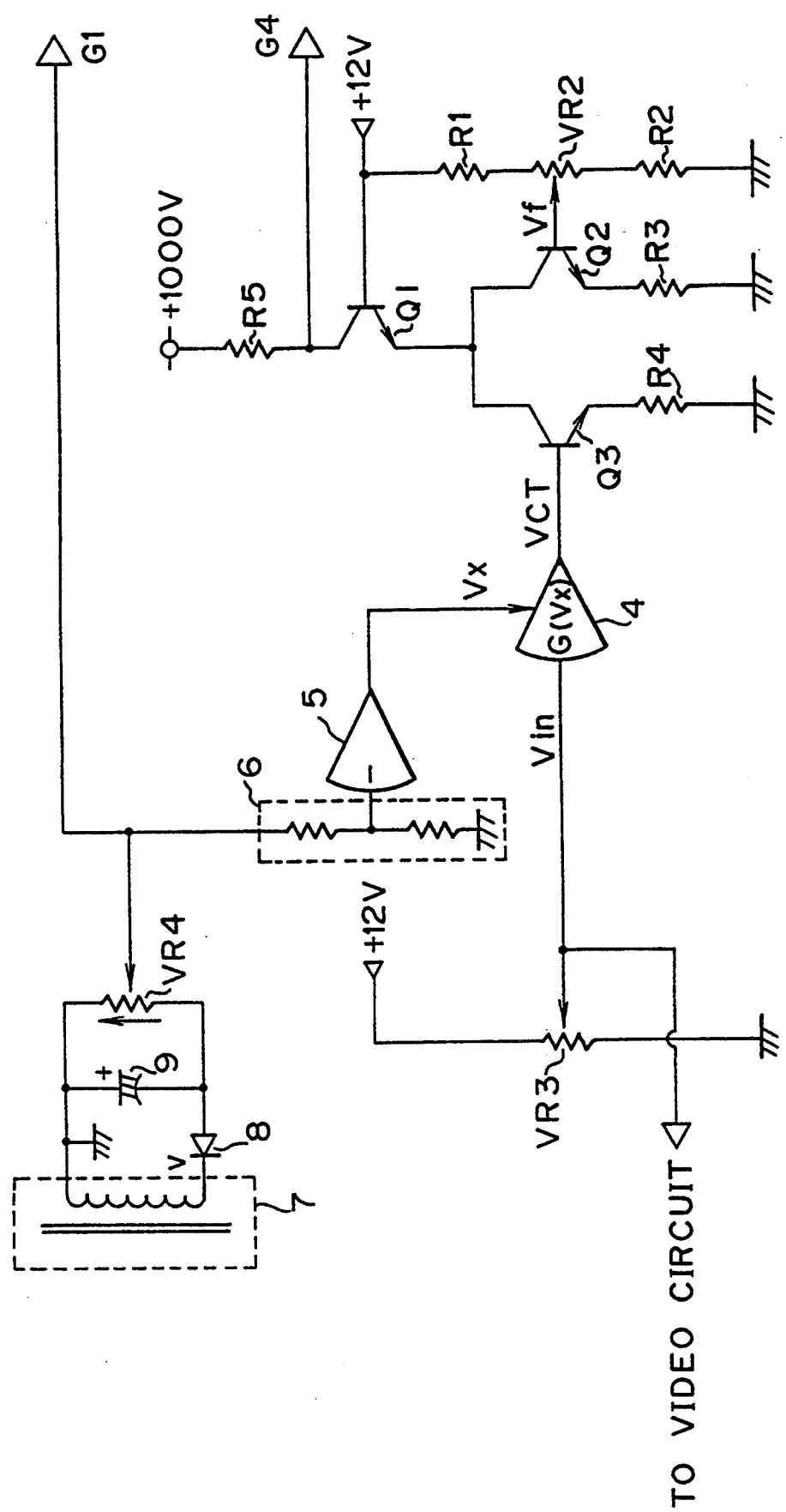
FIG. 6 is a circuit diagram of an embodiment of the present invention.

Referring to FIG. 6, which illustrates an embodiment of of the present invention, transistor Q2 and Q3 are cascode connected to transistor Q1. Resistors R3 and R4 are emitter resistors of transistors Q2 and transistor Q3, respectively. The base voltage of transistor Q2 is voltage Vf which is obtained by dividing +12 V with resistors R1, R2 and variable resistor VR2. Voltage Vf is adjusted by variable resistor VR2.

Variable resistor VR2 adjusts the focus bias voltage. When VBE (voltage between the base and the emitter) of transistor Q2 and VBE of transistor Q3 are ignored, a change of the focus bias voltage is given by the following expression:

$$-\Delta Vf(R5/R3) \; (V)$$

where $\Delta Vf$ is a variation of Vf.

The change of the focus bias voltage is applied to focus grid G4 via transistor Q1. The focus bias voltage setting means includes resistors R1, R2, R3 and R5, variable resistor VR2 and transistors Q1, Q2.

Figure 7:
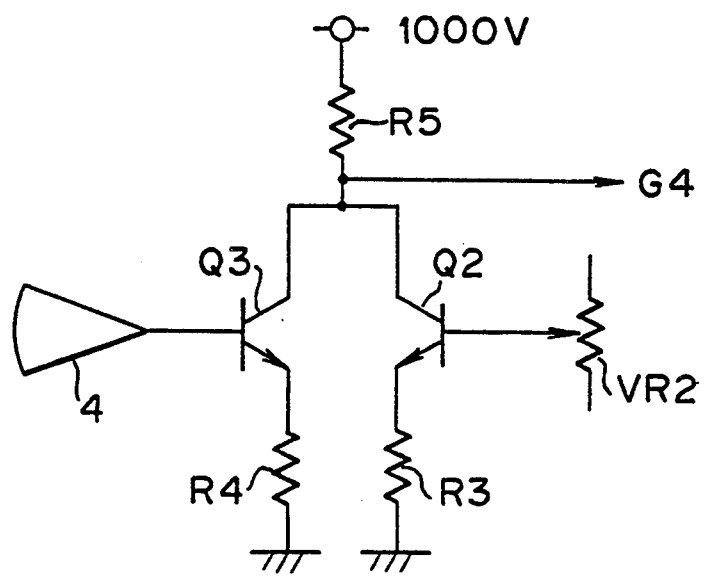
FIG. 7 is an example of a circuit for determining the focus bias voltage.

In FIG. 6, transistors Q2 and Q3 are connected to transistor Q1 in cascode so as to minimize the number of expensive high voltage transistors Q1. The circuit illustrated in FIG. 7 may also be used.

Output voltage VCT of an amplifier 4 of variable amplification factor type is applied to the base of transistor Q3, and a change of the focus bias voltage is given by the following expression:

$$-\Delta VCT(R5/R4)(V)$$

where $\Delta VCT$ is a variation of VCT

The change of the focus bias voltage described above is applied to focus grid G4 via transistor Q1. The bias voltage control means includes resistor R4 and transistor Q3.

As stated above, the focus bias voltage to be supplied by the collector of transistor Q1 to focus grid G4 can be changed by changing at least one of voltage VCT applied to the base of transistor Q3 and voltage Vf applied to the base of transistor Q2.

A voltage, which is obtained by dividing the voltage from a +12 V source with variable resistor VR3, is applied to a video circuit (not shown) as a luminance setting voltage and at the same time applied to an input terminal of the amplifier 4 of variable amplification factor type. Additionally, the amplification factor of the amplifier 4 is controlled by a control voltage Vx. Amplifier 4 amplifies the luminance setting voltage by an amplification factor which is inversely proportional to the control voltage Vx, and then supplies the amplified voltage VCT to the base of transistor Q3 as control information. The amplifying means includes amplifier 4. If control voltage VXO is supplied and the amplification factor of amplifier 4 is G (VXO), voltage VCT is given by the following expression:

$$Vin\ G(VXO) = VCT \tag{4}$$

where Vin is the voltage to be applied to the input terminal of the amplifier 4 by variable resistor VR3. When the video circuit is configured so that luminance is increased by adjusting variable resistor VR3 in a direction in which a received voltage is increased, a change of voltage VCT is given by the following expression:

$$\Delta VCT = \Delta Vin\ G(VXO) \tag{5}$$

where a change of voltage Vin is defined as ΔVin (a positive number). The focus bias voltage is changed as follows by applying the change of VCT of the output voltage from the amplifier 4 to the base of transistor Q3:

$$-\Delta Vin\ G(VXO)(R5/R4)(V)$$

Thus, at a fixed control voltage VXO, when the luminance is low (that is, beam current is low), VCT applied to the base of transistor Q3 is low and consequently the focus bias voltage is increased. At the fixed control voltage VXO, when the luminance is high (that is, beam current is large), VCT applied to the base of transistor Q3 is high and consequently the focus bias voltage is lowered. As a result, the focus bias voltage can be controlled for an increase or decrease of the beam current so that the G1—K characteristic curves have a slope moving down to the right in FIG. 5.

The difference in the slope and position of each characteristic curve depends on the difference in the voltage between control grid G1 and cathode K, as described below.

In FIG. 6, a power source for control grid G1 receives high voltage a.c. from the secondary winding of the flyback transformer 7. The voltage is rectified and smoothed by a diode 8 and a capacitor 9, respectively. The control grid bias voltage is supplied from the power source by way of a variable resistor VR4, and is applied to control grid G1. Since variable resistor VR4 is used to adjust the cut-off of the electron beam when the video signal is black, G1—K is on the order or 50 V to 100 V depending on the particular CRT. The voltage on cathode K is held constant.

The G1 bias voltage is converted to a voltage of an appropriate lower level by a resistor network 6 and is provided to an inverting input terminal of an amplifier 5. Thus, the amplification factor control voltage supplying means includes the resistor network 6 and the amplifier 5.

Where K=0 V (the cathode is held at OV), control grid G1 is adjusted to have the following voltage:

(a) When the voltage difference between G1 and K is 50 V, G1 is −50 V. (b) When a voltage difference between G1 and K is 90 V, G1 is −90 V.

If resistor network 6 provides voltage division by a ration of 1/10, the corresponding input voltages to amplifier 5 are:

(a) the input voltage is equal to −5 V.
(b) the input voltage is equal to −9 V.

Amplification characteristics of amplifier 5 may be linear or nonlinear, depending upon what is necessary for the CRT type. If amplification characteristics of the amplifier 5 are linear and the amplification factor is 1, when the difference between G1 and K is equal to 50 V, G1=−50 V, the input voltage is equal to −5 V, and the control voltage Vx is equal to 5 V.

When the difference between G1 and K is equal to 90 V, G1 is equal to −90 V, the input voltage is equal to −9 V, and control voltage Vx is equal to 9 V.

Figure 1:
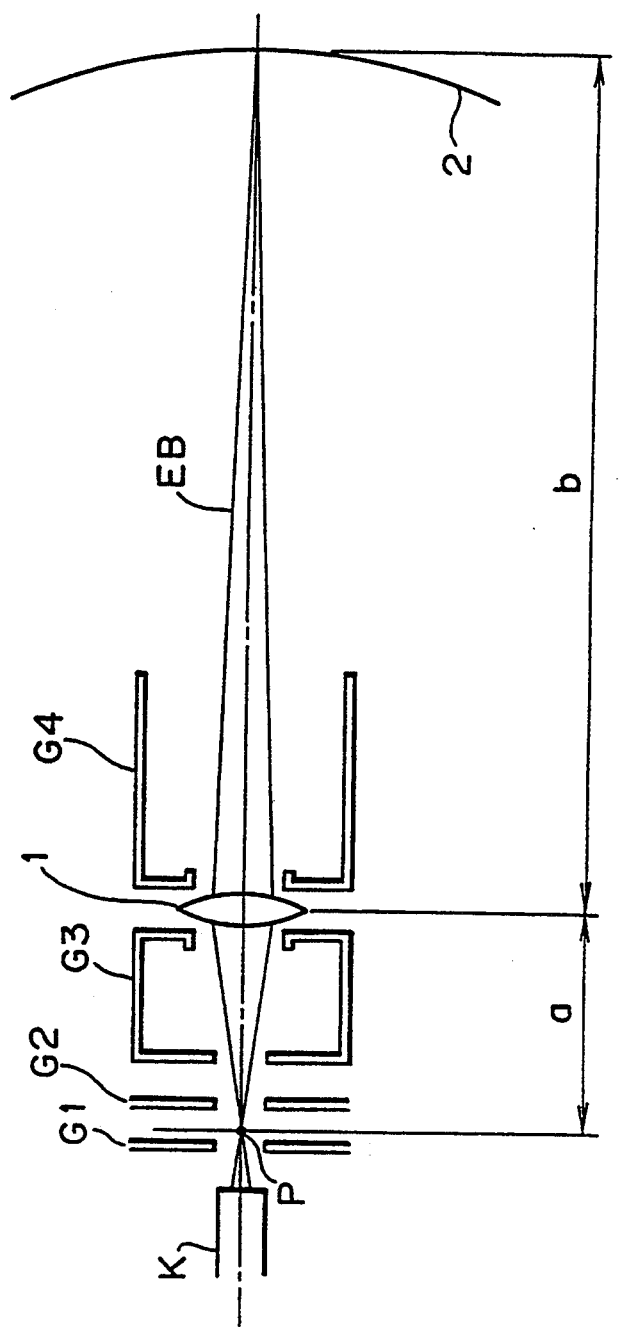
FIG. 1 is a schematic diagram illustrating construction of an electron gun of a CRT.
Figure 2:
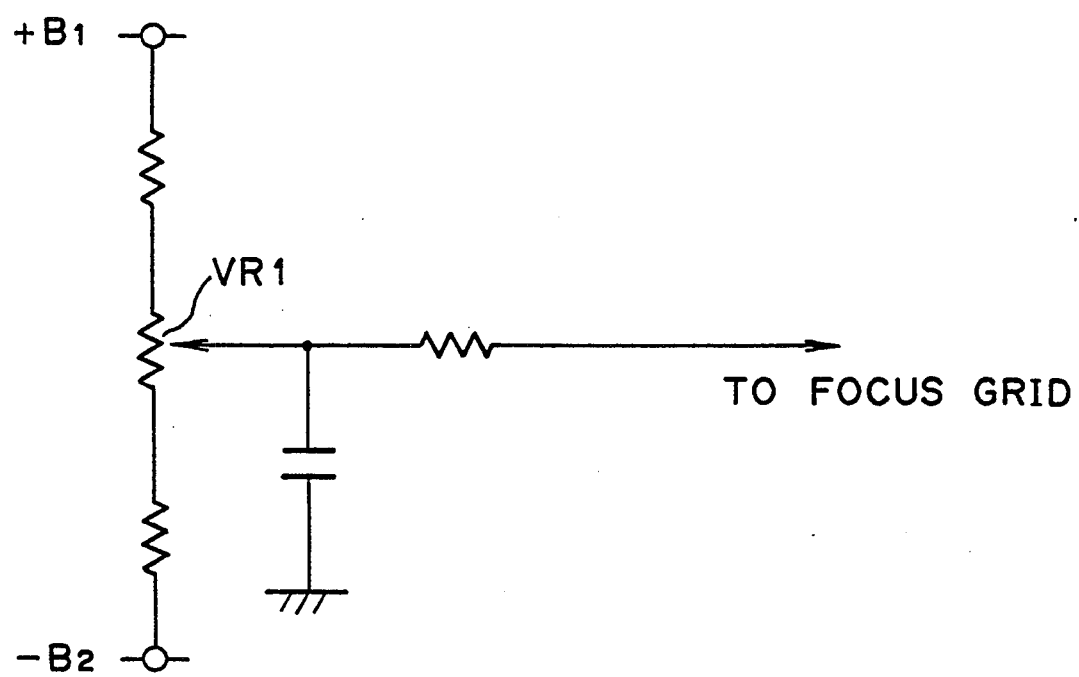
FIG. 2 is a schematic diagram illustrating a conventional focus bias circuit.
Figure 3:
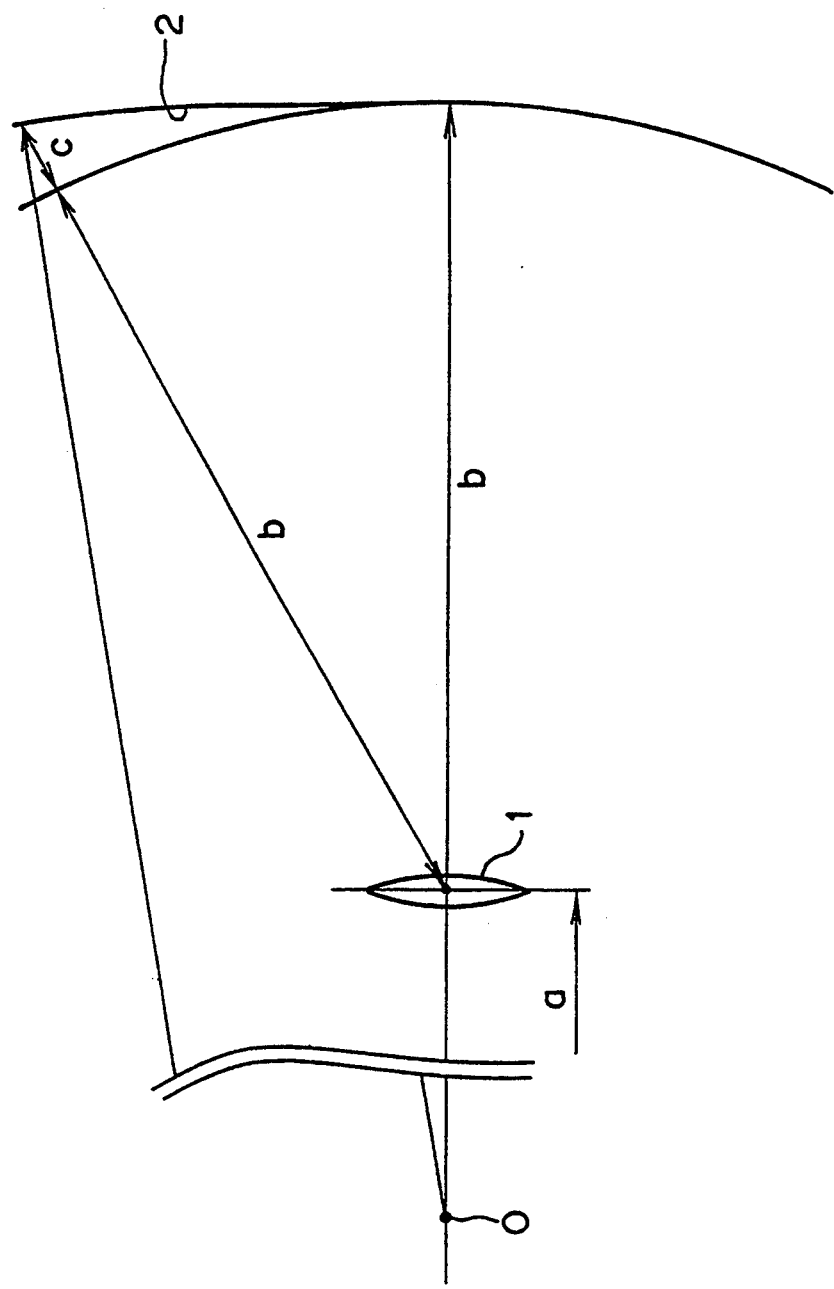
FIG. 3 is an illustration of the relationship between an electron lens and a fluorescent screen.
Figure 4:
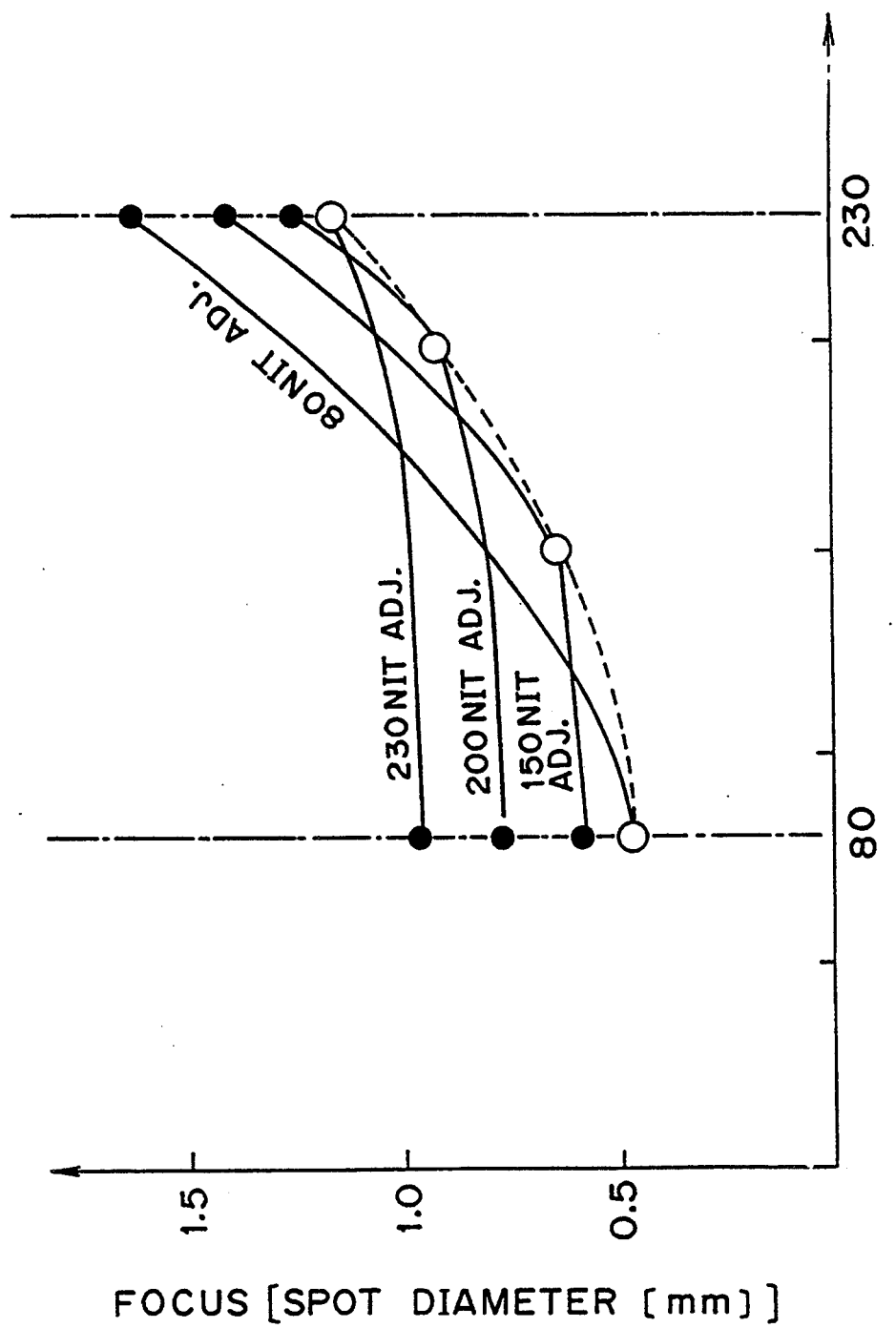
FIG. 4 is a graph showing the relationship between variation of luminance and spot diameter at each luminance, after best focusing.
Figure 5:
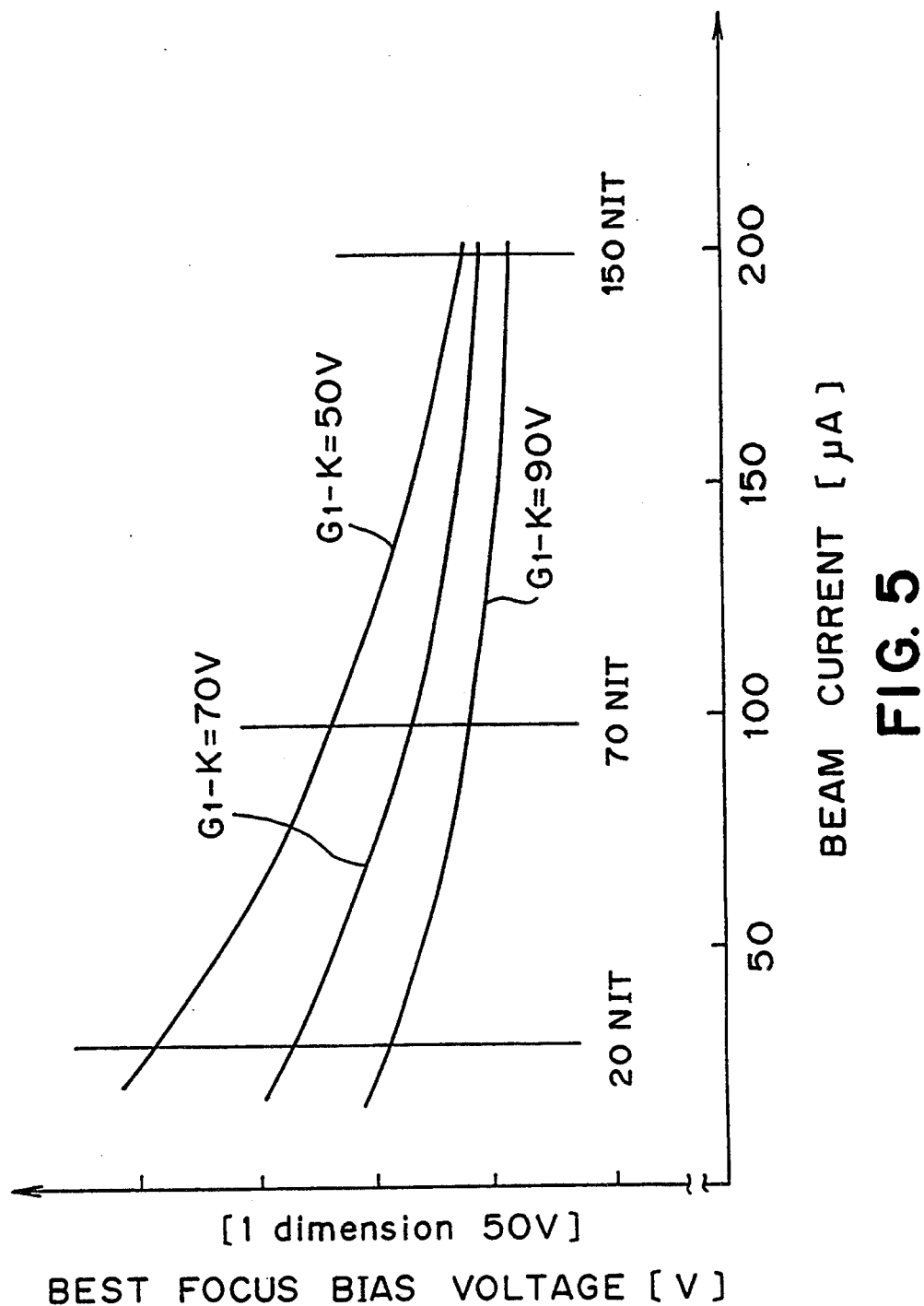
FIG. 5 is a graph showing the relationship between focus bias voltage and beam current when the best focus voltage is applied between the control grid and the cathode.

The relationship between control voltage Vx and the amplification factor of the amplifier 4 of variable amplification factor type, is assumed to be inversely proportional (nonlinear). Since the amplification factor of amplifier 4 is small and the rate of change in the output voltage VCT is small in the case of a difference between G1 and K of 90 V, the slope of the curve of G1−K=90 V is slightly inclined as shown in FIG. 5. Since the amplification factor of amplifier 4 is large, and the rate of change in the output voltage VCT is large in the case of the difference between G1 and K of 50 V, the slope of the curve of G1−K=50 V is greatly inclined as shown in FIG. 5.

Thus, in accordance with the present invention, even though luminance is changed or the voltage between control grid G1 and cathode K differs from CRT to CRT, the focus bias voltage is always automatically controlled so as to obtain the best focusing.

Although the invention has been described in connection with specific embodiments, it will be understood that those with skill in the art may be able to develop variations of the disclosed embodiments without departing from the spirit of the invention or the scope of the following claims.

We claim:

1. A focus control circuit for a CRT, comprising:
   focus bias voltage setting means for setting a focus bias voltage;
   bias voltage control means for controlling said focus bias voltage and said focus bias voltage setting means in response to control information;
   amplifying means for amplifying a luminance setting voltage for said CRT by an amplification factor determined by an amplification factor control voltage and supplying said amplified luminance setting voltage to said bias voltage control means as control information; and
   amplification factor control voltage supplying means for supplying a voltage, derived from a control grid voltage which is applied to a control grid of said CRT, to said amplifying means as said amplification factor control voltage.

2. The focus control circuit of claim 1, wherein:
   said focus bias voltage setting means includes a first transistor for outputting said focus bias voltage; and
   said focus bias voltage setting means and said bias voltage control means include a second transistor and a third transistor, respectively, said second transistor and said third transistor being commonly connected in cascode to said first transistor.

3. The focus control circuit of claim 1, wherein said amplification factor control voltage supplying means includes a resistor network for dividing a voltage to be applied to said control grid and an amplifier for inverting a voltage from said resistor network and supplying said voltage to said amplifying means.

4. The focus control circuit of claim 1, wherein said amplifying means has a gain which is inversely proportional to said amplification factor control voltage.

5. The focus control circuit of claim 1, wherein said amplification factor control voltage supplying means provides a voltage directly proportional to and of inverted polarity, with respect to said control grid voltage.

6. The focus control circuit of claim 1, wherein said amplification factor control voltage supply means includes a voltage divider having an input for receiving said control grid voltage and an output for supplying a divided voltage, and an amplifier for inverting said divided voltage and for providing at an output, said amplification factor control voltage.

* * * * *